United States Patent [19]

Jefferson et al.

[11] Patent Number: 5,604,858
[45] Date of Patent: Feb. 18, 1997

[54] METHOD AND SYSTEM FOR APPARENT DIRECT EDITING OF FIXED DISPLAY ELEMENTS WITHIN A DATA PROCESSING SYSTEM

[75] Inventors: Kendall J. Jefferson, Bedford; Kendall A. Lock, Trophy Club, both of Tex.

[73] Assignee: International Business Machines Corporation, Armonk, N.Y.

[21] Appl. No.: 928,249

[22] Filed: Aug. 10, 1992

[51] Int. Cl.$^6$ ........................................ G06F 3/14
[52] U.S. Cl. ........................................ 395/342
[58] Field of Search ........................ 395/155, 156, 395/157, 158, 160, 135, 149, 153, 146; 345/119, 120

[56] References Cited

U.S. PATENT DOCUMENTS

| | | | |
|---|---|---|---|
| 4,809,220 | 2/1989 | Carlson et al. | 395/117 |
| 5,140,678 | 8/1992 | Torres | 395/157 X |
| 5,201,034 | 4/1993 | Matsuura et al. | 395/155 |
| 5,228,123 | 7/1993 | Heckel | 395/155 |
| 5,233,687 | 8/1993 | Henderson, Jr. et al. | 395/158 |
| 5,286,202 | 2/1994 | de Gyarfas et al. | 395/135 X |
| 5,287,514 | 2/1994 | Gram | 395/155 X |
| 5,337,403 | 8/1994 | Klingman | 395/140 |
| 5,394,251 | 2/1995 | Henderson, Jr. et al. | 395/158 |
| 5,438,661 | 8/1995 | Ogawa | 395/157 |

OTHER PUBLICATIONS

Jensen et al., Harvard Graphics: The Complete Reference, 1990, pp. 584–609.
Stone, Preparing Art for Printing, 1983, pp. 140–143.
Weigand, Using Pagemaker, 1990, pp. 62–67.
Overson et al., Spontaneous Assembly, 1990, pp. 201–217.
Borland, Turbo Pascal, 1985, pp. 168–170.
Borland, Quattro User's Guide, 1987, p. 29, 385 to 400.
Object Vision: User Programming for Windows, PC Letter, Dec. 10, 1990 pp. 3–4.
Taylor, Object Vision 2.0 Developer's Guide, Apr. 1992, pp. 13–27.
Goodman, The Complete Hypercard Handbook, 1987, pp. 109–117, 123–128, 193–199, 281–293.
Jensen et al., Harvard Graphics: The Complete Reference, 1990, pp. 602–604.
Goodman, The Complete HyperCard Handbook, 1990, pp. 49–70, 133, 160–182.

*Primary Examiner*—Heather R. Herndon
*Assistant Examiner*—Anton W. Fetting
*Attorney, Agent, or Firm*—Edward H. Duffield; Andrew J. Dillon; Craig J. Yudell

[57] ABSTRACT

The method and system of the present invention provides apparent direct editing of fixed display elements within an application in a data processing system. An editable overlay window is established within a data processing system. Elements displayed within a main window provided by an application which are fixed such that they cannot be individually edited are selected. The editable overlay window is displayed directly over the fixed element. Upon effecting a change to the editable overlay window it appears to a user that the fixed element is apparently being edited directly within the main window. In one embodiment of the present invention, the information displayed in the fixed element is copied into the editable overlay window prior to the editable overlay window being displayed.

7 Claims, 5 Drawing Sheets

METHOD AND SYSTEM FOR APPARENT DIRECT EDITING OF FIXED DISPLAY ELEMENTS WITHIN A DATA PROCESSING SYSTEM

CROSS-REFERENCE TO RELATED APPLICATION

The present application is related to U.S. patent application Ser. No. 07/928,252, entitled "A Method and System for Apparent Direct Editing of Transient Graphic Elements Within a Data Processing System," filed of even date herewith by the inventors hereof and assigned to the assignee herein.

BACKGROUND OF THE INVENTION

1. Technical Field

The present invention relates in general to editing techniques within applications in a data processing system, and in particular to methods and systems for utilizing an editable overlay window for editing elements displayed by an application in a data processing system. Still more particularly, the present invention relates to a method and system for utilizing an editable overlay window for apparent direct editing of fixed display elements within a main window provided by an application within a data processing system.

2. Description of the Related Art

Graphic user interfaces are utilized in almost all computer systems today. Such interfaces typically utilize display management applications to control what is displayed including the size, position, priority, and number of active windows presented on a computer's video terminal display. In order to provide for user input, the display management application must have the capability to both obtain data and to display the information on the screen. In the past, such capabilities have been accomplished through utilization of input controls or dialog panels placed directly within the client area.

Individual input controls are simple tools, but they are not efficient when utilized in multiple numbers. A main window containing multiple input controls could be drawn using individual editable controls; however, the system would be slowed down significantly with each control displayed. This slowing of system processing occurs because more data processing is required to calculate and draw each individual control image. In order to avoid this problem, the entire main window is generally drawn with a single message rather than sending multiple display messages for all editable controls within the main window. This technique saves a great deal of processing time, but it prevents the user from typing directly into the main window of an application to edit individual controls. The controls are therefore "fixed" within the main window image such that they cannot be individually edited or controlled. In the known systems, the only way to change the display of a particular control within a window is to update and redraw the entire main window.

To allow user control and editing in known systems, dialog boxes may be utilized for controls within windows that do not directly accept user inputs. When a control requires user input, the application provides a new window at a separate location in which the selected control's dialog box is displayed. This dialog box allows direct user command of various controls within the dialog box. When editing of the dialog box is complete, the revised information is updated on the main window.

Unfortunately, there are a number of disadvantages to utilizing dialog boxes. When an application utilizes a dialog box, the application takes time to load, initialize, and then display the dialog box. Moreover, a user may be confused when the same information is displayed within two different windows and in two different formats. Thus, there is a need for an editing capability within an application which permits the user to perform apparent editing of a fixed element or control within the main window while maintaining the efficiency of processing and drawing only one display message to the main window.

SUMMARY OF THE INVENTION

It is therefore one object of the present invention to provide an improved editing technique for applications in a data processing system.

It is another object of the present invention to provide an improved method and system for utilizing an editable overlay window for editing fixed elements displayed by an application in a data processing system.

It is yet another object of the present invention to provide an improved method and system for utilizing an editable overlay window for apparent direct editing of fixed display elements within a main widow provided by an application within a data processing system.

The foregoing objects are achieved as is now described. The method and system of the present invention provides apparent direct editing of fixed display elements within an application in a data processing system. A fixed element displayed within a main window provided by an application which is fixed such that it cannot be individually edited is selected, and an editable overlay window is established within a data processing system. The editable overlay window is then displayed directly over the fixed element. Thereafter, entries into the editable overlay window appear to a user to be editing the fixed element directly within the main window. In one disclosed embodiment of the present invention, the information displayed in the fixed element is initially copied into the editable overlay window prior to the establishment of the editable overlay window display such that the information may be edited.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
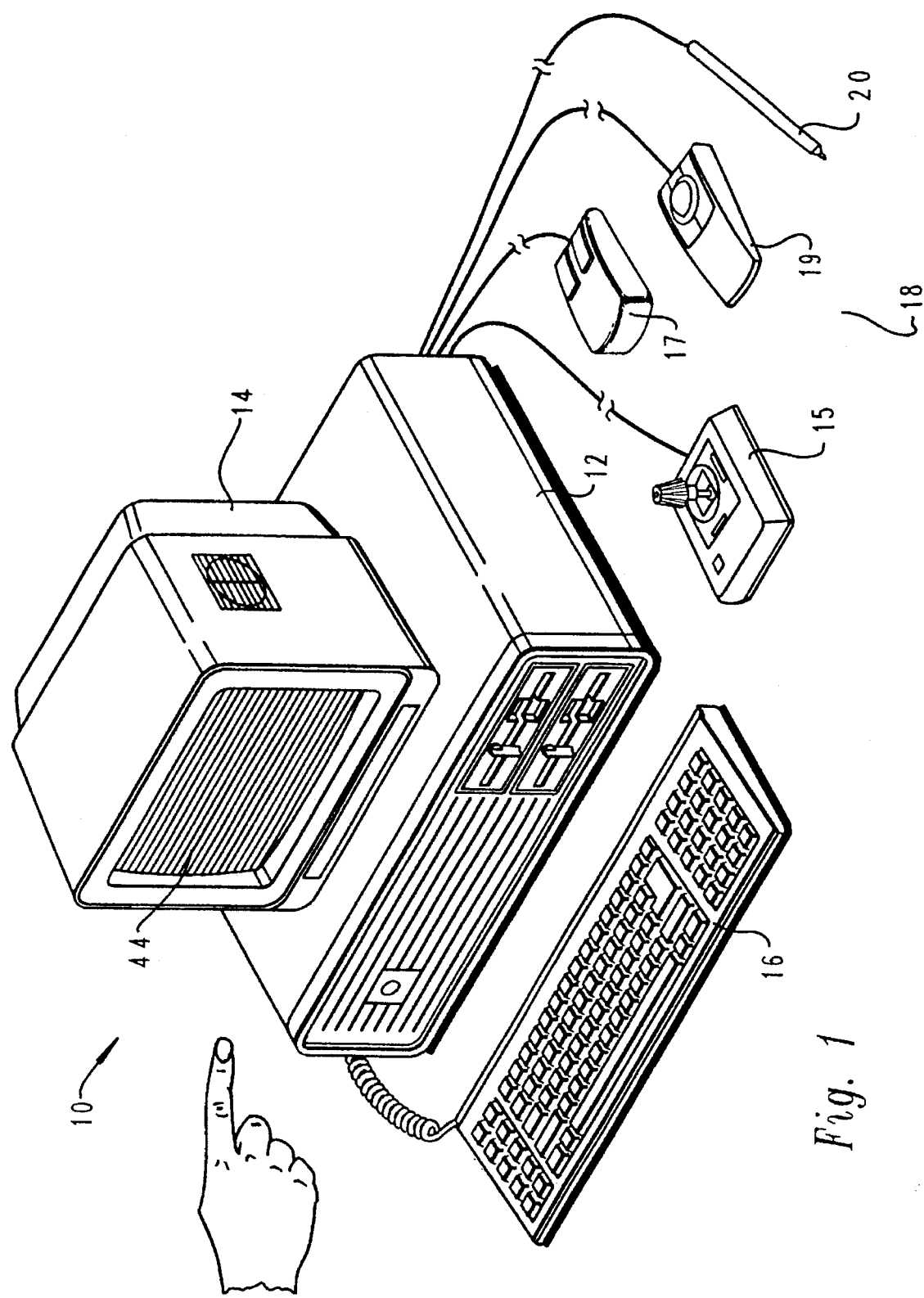
FIG. 1 is a pictorial representation of a personal computer system which may be utilized to implement the method and system of the present invention.

With reference now to the figures and in particular with reference to FIG. 1, there is depicted a pictorial representation of a personal computer system 10 which may be utilized to implement the method and system of the present invention. Personal computer system 10 preferably includes a system unit 12, computer display screen 14, keyboard 16, and multiple graphical input pointing devices 18. Those skilled in the art will appreciate that graphical input pointing devices 18 may be implemented utilizing a pointing stick 15, a mouse 17, a track ball 19, a light pen 20, touch display screen 44, or any other device that permits the user to manipulate objects in a graphical manner on display screen 14.

Figure 2:
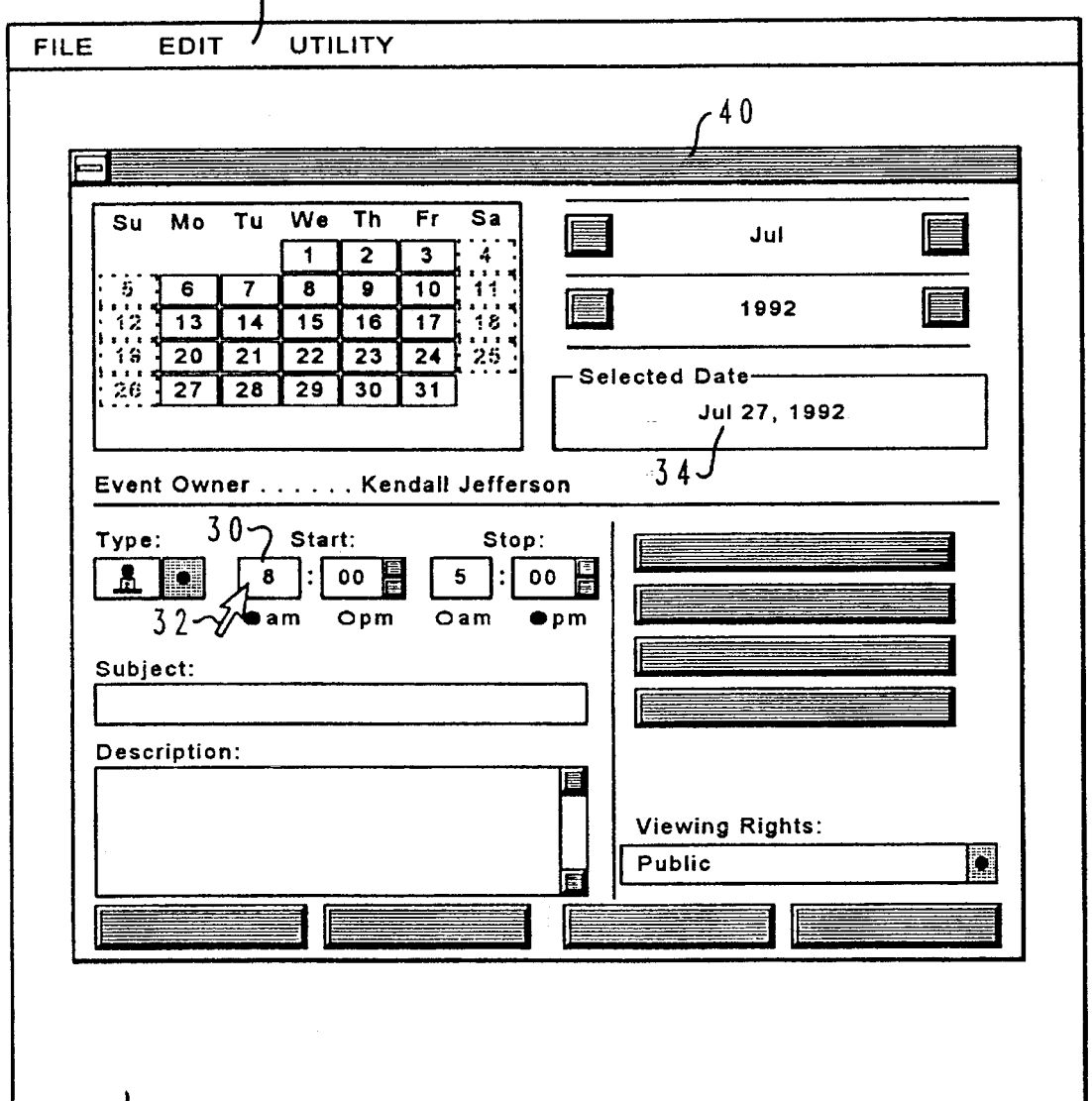
FIG. 2 depicts a computer display screen containing an application's main window comprised of fixed display and control elements to be edited in accordance with a preferred embodiment of the present invention.

Referring now to FIG. 2, there is illustrated a pictorial representation of a computer display screen 44 which contains a menu bar 42 and a main window 40. Main window 40 contains various controls and displays. As an example, FIG. 2 illustrates an event calendar applications control window.

The application's main window contains various control and display elements which are "fixed". These elements are "fixed" elements such that they are not editable from the main window within which they are displayed. This usually occurs when the application providing the main window is sending only one draw message to the video display to create the entire main window, rather than sending individual messages for each control or image displayed.

In accordance with the present invention, the user may select fixed element 30 within the main window to be edited. This may be accomplished through keyboard commands or utilizing mouse pointer 32.

Figure 3:
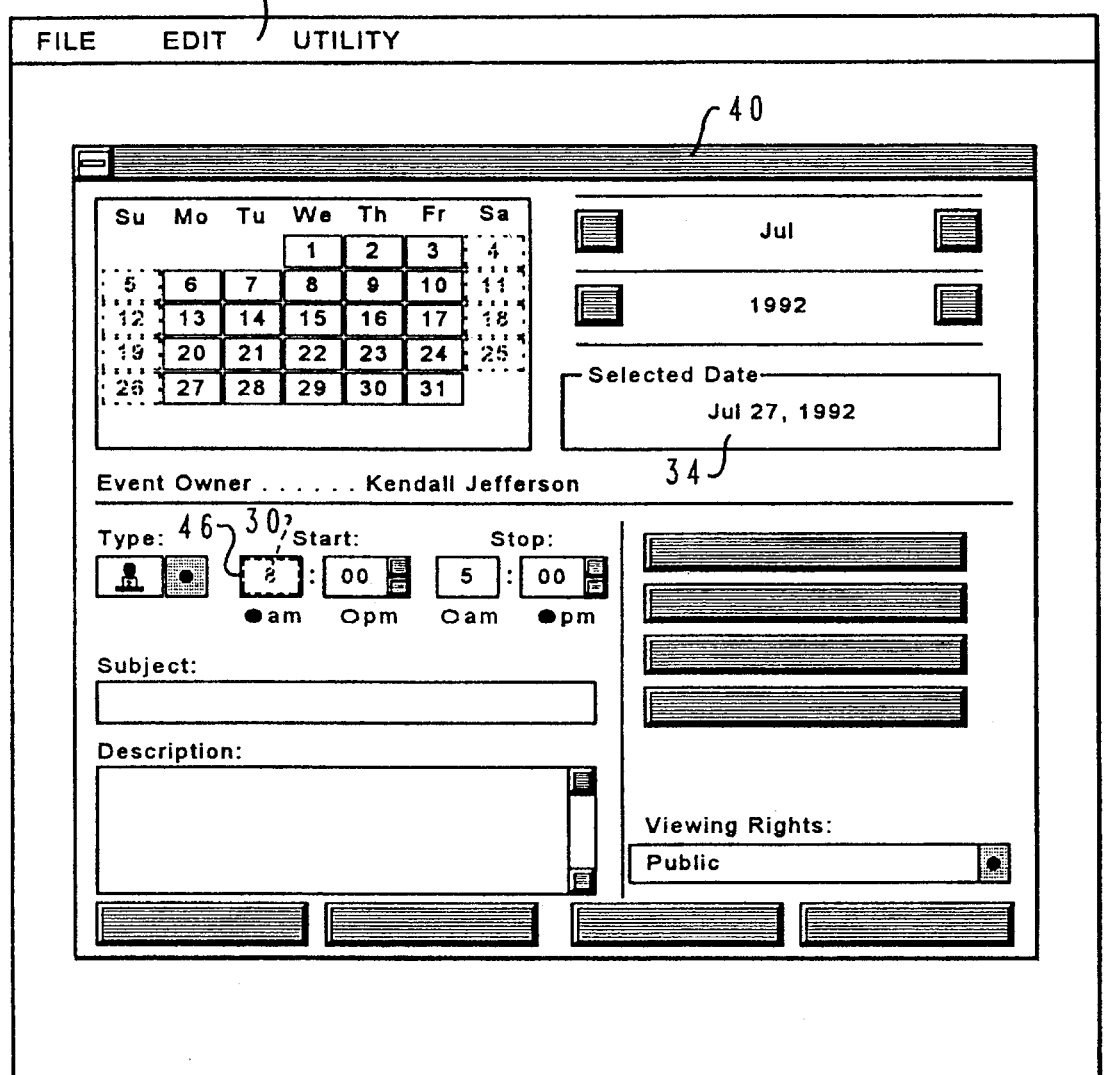
FIG. 3 illustrates a computer display screen containing an application's main window containing a fixed element overlaid by an editable overlay window in accordance with the preferred embodiment of the present invention.

Referring now to FIG. 3 in accordance with the method and system of the present invention, editable overlay window 46 is created, sized to the dimensions of fixed element 30, and displayed overlaying fixed element 30 within main window 40 on display 44 in a manner typically utilized in the creation of graphic objects within a computer display. Of course, those skilled in the art will appreciate that editable overlay window 46 may be created to match the background of fixed element 30 or may be created to contrast with the background of fixed element 30 by using techniques such as a different color, a different font, an alteration in borderlines, or a temporal indicator such as a blinking curser. A user may thereafter input or edit information within editable overlay window 46. From the user's perspective, it will appear that the main window is being edited directly.

Figure 4:
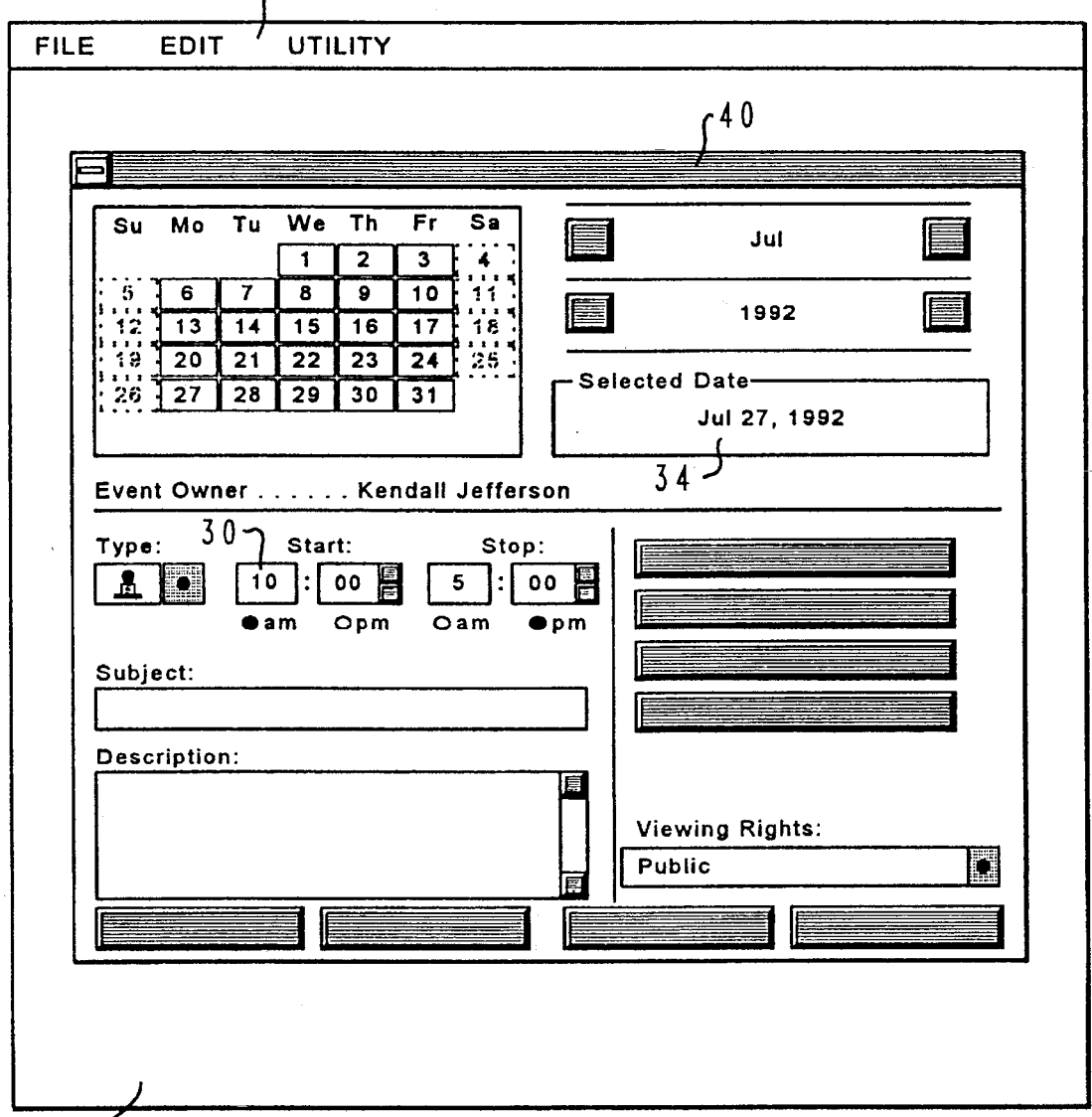
FIG. 4 illustrates a computer display screen containing an application's main window comprised of fixed display and control elements including a fixed element which has been edited in accordance with a preferred embodiment of the present invention.

Referring now to FIG. 4, there is depicted a main window containing fixed element 30 displayed with the edited information after the completion of the method and system of the present invention. When editing is complete as may be indicated by a user using a keyboard command or mouse pointer 32, the edited information is copied from editable overlay window 46 and incorporated into the display message sent to fixed element 30 by the display management application when main window 40 is redrawn. The editable overlay window 46 is then removed from display 44, and main window 40 is redrawn on display 44. Alternatively, editable overlay window 46 remains displayed within main window 40.

Figure 5:
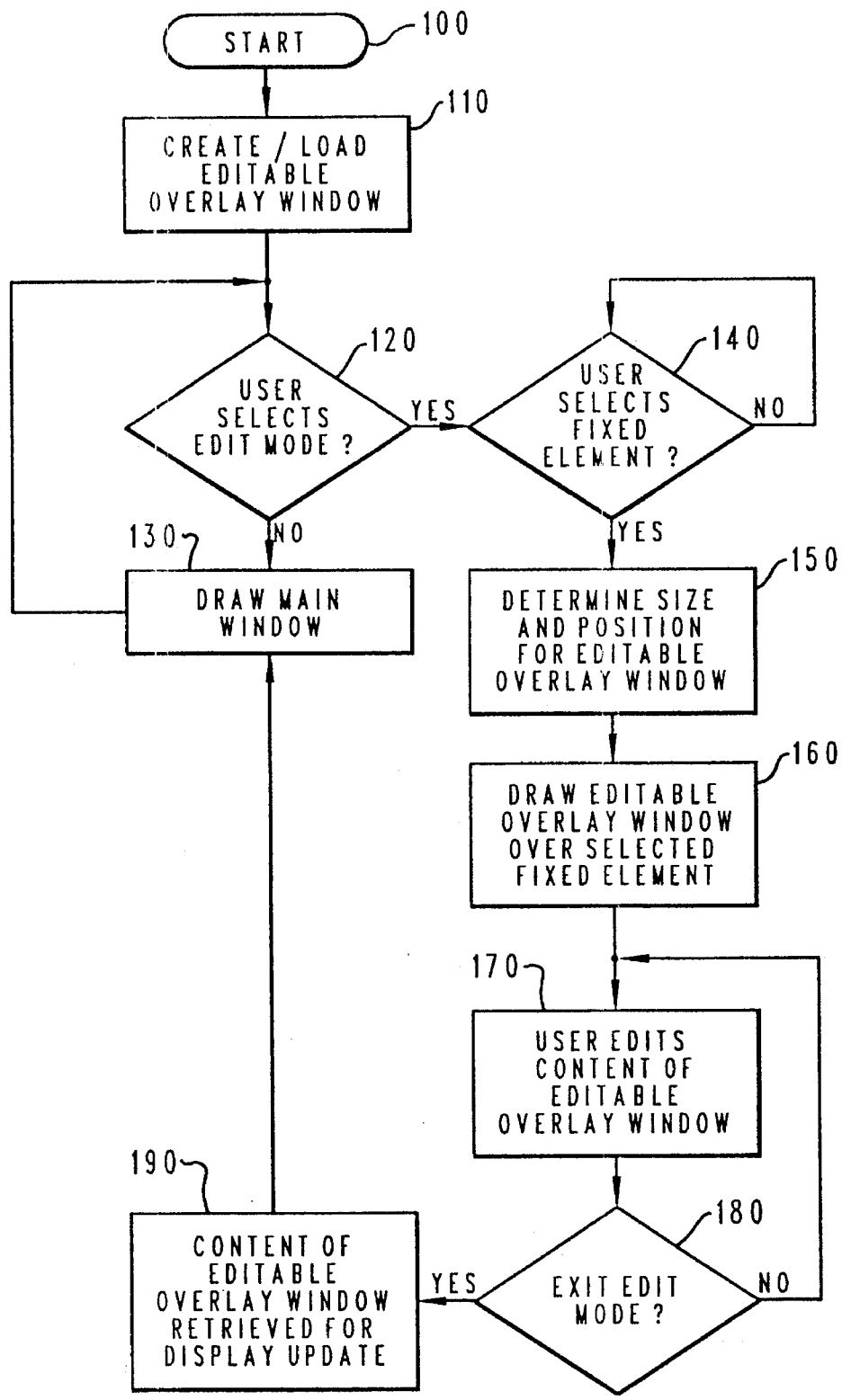
FIG. 5 is a high-level flowchart depicting a method and system of editing a fixed element by apparent direct editing within a main window using an editable overlay window in accordance with a preferred embodiment of the present invention.

Referring now to FIG. 5, there is depicted a high-level flowchart representing the utilization of the method and system of the present invention wherein an editable overlay window is created and displayed in order to provide apparent direct editing of a fixed element within a main window. As is illustrated, the method begins at block 100. Thereafter, as illustrated at block 110, an editable overlay window is established and loaded into the computer's active memory by the data processing system. The editable overlay window that is created may be a small window with several controls or a single control such as an entry field. This editable overlay window is established in a manner typically utilized in the creation of window displays in window based applications.

Thereafter, as illustrated in block 120, the user or the system is queried to determine whether an edit mode should be entered whereby the user would be allowed to edit elements displayed in the main window. In one embodiment of the present invention, the data processing system may prompt the user on whether or not to enter the edit mode. In another embodiment, the system may initiate the edit mode after receiving a command from the user such as a series of keyboard key commands or a mouse driven command. If the determination in block 120 is that the edit mode should not be entered, as illustrated in block 130, a draw message containing the current information of the main window is sent to the display by the display management application in a manner typically utilized in the creation of graphic objects within a computer display.

In the event the determination illustrated in block 120 indicates that the edit mode should be entered then, as depicted in block 140, the user or system selects a fixed element or elements displayed within the main window to edit. Selected fixed elements could be displayed text, an icon which is to be edited to create a different image, titles or headings to be changed, actual system controls, or data entry ports.

Thereafter, the method continues as illustrated in block 150 to determine the correct size and shape of the editable overlay window so that it equals the dimensions of the element selected. Also, the position on the computer display screen at which the editable overlay window should be displayed in order to overlay the selected element within the main window is determined. In an alternative embodiment, the information such as an icon or text displayed within the element may be copied into the editable overlay window.

Once the overall dimensions and position for the editable overlay window is determined, the method continues as illustrated in block 160 to display the editable overlay window directly over the fixed element such that it overlays the fixed element either partially or completely. To the user, the editable overlay window is transparent because it appears the only window displayed is the main window. Alternatively, the editable overlay window is contrasted with the fixed element by creating a visual distinction such as a different background color.

Block 170 depicts the step in the method where the user edits the content of the editable overlay window. Entries into the editable overlay window appear to a user to be editing the fixed element directly in the main window, whereas, in fact, the user is editing the editable overlay window.

When editing of the editable overlay window has been completed, the edit mode is exited. Block 180 depicts the determination whether or not to exit the edit mode is made. Preferably, the edit mode is exited in response to a user input such as a keyboard or mouse driven command.

As depicted in block 190, the contents of the editable overlay window which was created by the user while in edit mode is retrieved by the data processing system. The display message sent by the display management application is updated to reflect the edited information so that the main window is redrawn showing the edited element.

Upon reference to the foregoing those skilled in the art will appreciate that the method and system of the present invention may be utilized to present a user of a data processing system with the illusion of having the capability to change, edit, or control fixed elements, images or controls directly within a main window. By creating an editable overlay window which may appear as any one of many fixed elements within a main window, accessing that editable overlay window in order to create edited information, and updating the draw message sent to the main window using the edited information, a method of editing fixed elements displayed within a main window is performed which creates the illusion of allowing direct editing of the fixed elements.

While the invention has been particularly shown and described with reference to a preferred embodiment, it will be understood by those skilled in the art that various changes in form and detail may be made therein without departing from the spirit and scope of the invention.

We claim:

1. A method of apparent direct editing of a fixed element displayed within a main window being provided by an application within a data processing system, said method comprising the data processing system implemented steps of:

creating an editable overlay window, wherein said editable overlay window allows its shape or its contents to be edited;

in response to the selection of a first fixed element displayed within a main window that is a separate and distinct window from said editable overlay window, wherein the main window contains at least two fixed elements including the first fixed element and a second fixed element, and further wherein the fixed element is fixed such that it cannot be edited or cannot be controlled directly in the main window, sizing and shaping said editable overlay window so that said editable overlay window equals the dimensions of said first fixed element, and overlaying said editable overlay window over said main window so that said editable overlay window is precisely positioned such that said first fixed element is no longer displayed, but such that portions of said main window including the second fixed element remain displayed; and permitting a user to create and edit information within said editable overlay window, wherein, because the dimensions of said editable overlay window are indistinguishable from said selected first fixed element, it appears from visual observation by a user of the displayed portions of the main window that said fixed element is being edited directly within said main window when, in fact, information is created and edited by said user in said editable overlay window.

2. A method of apparent direct editing of a fixed element displayed within a main window provided by an application within a data processing system according to claim 1, wherein editable information is created within the editable overlay window by said user, further including the steps of retrieving the information contained in said editable overlay window, updating the information contained in said main window such that the retrieved information replaces information used to draw the fixed element and redisplaying said main window.

3. A method of apparent direct editing of a fixed element displayed within a main window provided by an application within a data processing system according to claim 1, further including the step of in response to the selection of a fixed element displayed within a main window, retrieving information used to generate the visual display of said fixed element and generating the visual display of said fixed element in said editable overlay window so that said information is displayed by said editable overlay window when said editable overlay window is displayed.

4. A method according to claim 3, wherein said information in said editable overlay window is displayed such that said editable overlay window is visually indistinguishable from said fixed element.

5. A method of apparent direct editing of a fixed element displayed within a main window provided by an application within a data processing system according to claim 1, wherein said fixed element is a bitmap image.

6. A method of apparent direct editing of a fixed element displayed within a main window provided by an application within a data processing system according to claim 1, wherein said fixed element is comprised of alphanumeric characters.

7. A data processing system for apparent direct editing of a fixed element displayed within a main window provided by an application, said data processing system comprising:

means for creating an editable overlay window, wherein said editable overlay window allows its shape or its contents to be edited;

means for, in response to the selection of a first fixed element displayed within a main window that is a separate and distinct window from said editable overlay window, wherein the main window contains at least two fixed elements including the first fixed element and a second fixed element, and further wherein the fixed element is fixed such that it cannot be edited or cannot be controlled directly in the main window, sizing and shaping said editable overlay window so that said editable overlay window equals the dimensions of said first fixed element, and overlaying said editable overlay window over said main window so that said editable overlay window is precisely positioned such that said first fixed element is no longer displayed, but such that portions of said main window including the second fixed element remain displayed; and means for permitting a user to create and edit information within said editable overlay window, wherein, because the dimensions of said editable overlay window are indistinguishable from said selected first fixed element, it appears from visual observation by a user of the displayed portions of the main window that said first fixed element is being edited directly within said main window when, in fact, information is created and edited by said user in said editable overlay window.

\* \* \* \* \*